(12) United States Patent
Belykh et al.

(10) Patent No.: US 7,157,149 B2
(45) Date of Patent: Jan. 2, 2007

(54) SURFACE-MODIFIED GLASS-CERAMICS AND THEIR PREPARATION

(75) Inventors: Anna V Belykh, Orlando, FL (US); Sergey K Evstropiev, Suwon-si (KR); Mikhail D Mikhailov, St. Petersburg (RU); Lionel Beunet, Fountainbleau (FR); Monique Comte, Fontenay-aux-Roses (FR); Sophie Peschiera, Veneux les Sablons (FR)

(73) Assignee: EuroKera, Chateau-Thierry (FR)

( * ) Notice: Subject to any disclaimer, the term of this patent is extended or adjusted under 35 U.S.C. 154(b) by 0 days.

(21) Appl. No.: 11/009,738

(22) Filed: Dec. 10, 2004

(65) Prior Publication Data

US 2005/0153142 A1 Jul. 14, 2005

(30) Foreign Application Priority Data

Dec. 11, 2003 (FR) .................................. 03 14540

(51) Int. Cl.
B32B 9/00 (2006.01)

(52) U.S. Cl. .................. 428/469; 428/428; 428/446; 428/688; 428/426

(58) Field of Classification Search ................ 428/446, 428/426, 411.1, 210
See application file for complete search history.

(56) References Cited

U.S. PATENT DOCUMENTS

| 3,615,318 A | 10/1971 | Jagodzlaski et al. ........... 65/30 |
| 3,625,718 A | 12/1971 | Petticrew et al. ............. 160/39 |
| 3,764,444 A | 10/1973 | Simmons ........................ 161/1 |
| 3,779,856 A | 12/1973 | Pirooz .......................... 161/64 |
| 3,791,808 A * | 2/1974 | Thomas ....................... 65/30.1 |
| 3,876,407 A | 4/1975 | Hirose et al. ................... 65/30 |
| 3,926,602 A | 12/1975 | Andrus et al. .................. 65/33 |
| 4,074,993 A * | 2/1978 | Ackerman et al. .......... 65/30.14 |
| 5,070,045 A | 12/1991 | Comte et al. ................... 501/4 |
| 5,446,008 A | 8/1995 | Krolla et al. .................. 501/68 |
| 5,931,152 A | 8/1999 | Fafet et al. .................. 126/214 |
| 5,968,219 A | 10/1999 | Gille et al. ................... 65/33.8 |
| 6,528,440 B1 | 3/2003 | Vilato et al. .................... 501/7 |
| 2002/0026932 A1* | 3/2002 | Mitra et al. ............... 126/39 D |
| 2003/0172676 A1 | 9/2003 | Evstropiev ................. 65/30.13 |

FOREIGN PATENT DOCUMENTS

| JP | 59035032 | 2/1984 |
| JP | 5185455 | 12/1989 |
| JP | 04-069482 | 2/1992 |
| JP | 11100229 | 4/1999 |
| JP | 2003-070585 | 11/2003 |

* cited by examiner

Primary Examiner—Jennifer C. McNeil
Assistant Examiner—Elizabeth D. Ivey
(74) Attorney, Agent, or Firm—Siwen Chen

(57) ABSTRACT

The present invention relates to a product, comprising a body which is delimited by a surface, of a lithium aluminosilicate-based glass-ceramic, as well as to its method of preparation. Characteristically, said glass-ceramic has, on at least one part of said surface, a surface layer the degree of crystallization of which is greater than that of said glass-ceramic within said body.

11 Claims, No Drawings

SURFACE-MODIFIED GLASS-CERAMICS AND THEIR PREPARATION

FIELD OF INVENTION

The present invention relates to glass-ceramic products and method of making the same. In particular, the present invention relates to surface-modified lithium aluminosilicate glass-ceramic products and a method of making the same. The present invention is useful, for example, in the production of glass-ceramic cooktops.

BACKGROUND OF THE INVENTION

Glass-ceramic products have been developed a lot over the last years. They are commonly used notably as cooktops, fireplace fire-window plates, pan-type cooking utensils, and the like. Such products are obtained by ceramming a glass precursor (called "green glass"). Products containing β-quartz solid solution as the main crystalline phase are usually transparent. Products containing β-spodumene solid solution as the main crystalline phase are usually translucent or opaque. Furthermore, the glass-ceramic can contain colorants within it, giving it a specific color.

A technique known in the prior art of coloring glass-ceramic product involves adding coloring metal ions into the precursor glass compositions. This is a coloration in the mass of the products which incorporates as ions of, for example, cobalt, chromium, iron, manganese, nickel, vanadium and/or cerium. This coloration technique is, on an industrial scale, a little arduous to manage because, in order to proceed form one batch having one color to another batch having another color, the manufacture process usually has to be interrupted. Furthermore, such a coloration in the mass is not able to confer a metallic appearance to the surface.

According to the prior art, other methods are also proposed for coloring and decorating glass-ceramic products.

WO-A-03 048062 and WO-A-03 048063 describe two "analogous" methods for coloring glass-ceramic products. These two methods are carried out on the finished product and consist in introducing coloring ions onto the surface of said product. These ions are introduced in the vapor phase, in the form of $CuCl$, $CoCl_2$, $NiCl_2$, $MnCl_2$ or mixtures thereof (WO-A-03 048062), or dissolved in a solvent, in the form of oxides or chlorides of metals selected from Co, Ni, Mn, Cr, Fe and mixtures thereof (WO-A-03 048063). These coloring ions penetrate the surface of the glass-ceramic and diffuse into within it. They do not modify the crystalline structure of said glass-ceramic, and do not confer a metallic appearance to the surface of the glass-ceramic in question.

In order to attempt to confer such a metallic appearance to glass-ceramic plate surfaces, decorating enamel has been conventionally deposited on said surfaces. This is a surface treatment which is implemented on the finished product. The result is not fully satisfactory with reference to the metallic appearance sought after.

Another method has been proposed in US patent U.S. Pat. No. 3,926,602 with the same aim of conferring a metallic appearance to the surface of a glass-ceramic article. The glass precursor composition contains ferrous oxide (FeO) and, during the ceramizing heat treatment, the iron migrates to the surface and generates a surface layer of hematite ($\alpha$-$Fe_2O_3$) thereon. Said heat treatment is somewhat delicate to implement. Apart from the ceramization, it must ensure the control of the migration or diffusion of the iron within the mass of the product undergoing ceramization.

In such a context, the inventors searched for a novel surface treatment method to decorate and/or color the surface of the glass-ceramic products, which enables novel glass-ceramic products to be made. Such method should overcome the disadvantages of the prior art methods described above, produce interesting effects on the appearance, yet does not compromise the mechanical properties of the material, and does not lead to undesirable alteration of the intrinsic properties of the glass-ceramic, such as ability to be scored or marked, and the like.

U.S. Pat. No. 3,764,444 describes glass-ceramic article having a surface layer with higher degree of crystallization than the body within, thus a higher flexural strength than an article containing only the same glass-ceramic as that of the main body portion. However, this reference does not disclose whether the surface modification would lead to change in appearance. In addition, the ion exchange process disclosed in this reference to achieve higher degree of surface crystallization is inconvenient to carry out.

U.S. Pat. No. 3,779,856 discloses a process for making glass-ceramic article having higher degree of surface crystallization involving nucleating the precursor glass in the presence of a reducing atmosphere. It is alleged in this reference that nucleating agents reduced near the surface area leads to a higher degree of crystallization. Again, this reference does not disclose whether the article thus produced would have changed appearance. In addition, the reference hints that this process may not be applicable for all lithium aluminosilicate-based glass-ceramic articles. In the claims of this reference, it is required that the precursor glass comprises CuO and/or $Fe_2O_3$. Moreover, the requirement of the presence of reducing atmosphere in the high temperature nucleating process renders it undesirable.

U.S. Pat. No. 3,615,318 discloses a process for decorating transparent glass-ceramic articles involving selective heating part of the surface to impart opacification thereof. The process requires the use of a high power specialty irradiation source, such as infrared lamp, and the selective application of irradiation absorbing materials onto the surface.

Japanese patent application publication Nos. 58185455 and 59035032 disclose that the surfaces of lithium aluminosilicate glass-ceramic articles may be modified by heat-treatment with a coating of crystallization-promotion agents applied. The crystallization-promoting agents include $\gamma$-$Al_2O_3$ and surfactant, $Na_2SO_4$ and $Na_2S_2O_7$. While both references disclose that the flexural strength of the articles improved as a result, it is not clear whether the appearance of the article is changed.

In view of the prior art described above, there exists a genuine need of glass-ceramic articles with improved strength, appearance and ease of production. The present inventors have invented a new process for modifying the surface of lithium aluminosilicate-based glass-ceramic articles to produce glass-ceramic articles satisfying such needs.

SUMMARY OF THE INVENTION

According to a first aspect of the present invention, it is provided a lithium aluminosilicate-based glass-ceramic product comprising a body delimited by at least one surface, at least one part of said surface having a modified surface layer with a higher degree of crystallization than that of the body under said modified surface layer, characterized in that, compared to the body of the product under said modified surface layer, said modified surface layer contains higher amount of at least one crystallization-promoting chemical element selected from the group consisting of Zn, Cu, Zr, La, Nb, Y, Ti, Ge, V, Sn and mixtures thereof; preferably selected from the group consisting of Zn, Cu, Zr, La, Nb, Y, Ti, Ge and mixtures thereof; more preferably selected from the group consisting of Zn, Cu, Zr, La, Nb, Y and mixtures thereof; most preferably selected from the group consisting of Zn and Cu.

According to a preferred embodiment of the lithium aluminosilicate-based glass-ceramic product of the present invention, the surface of the product comprises at least two zones having modified surface layers with different degrees of crystallization.

According to one embodiment of the lithium aluminosilicate-based glass-ceramic product of the present invention, the product has a predominant crystalline phase of β-quartz solid solution within said body, and has a predominant crystalline phase of β-quartz solid solution in said modified surface layer having higher degree of crystallization.

According to another embodiment of the lithium aluminosilicate-based glass-ceramic product of the present invention, the product has a predominant crystalline phase of β-quartz solid solution within said body, and has a predominant crystalline phase of β-spodumene solid solution in said modified surface layer having higher degree of crystallization.

According to yet another embodiment of the lithium aluminosilicate-based glass-ceramic product of the present invention, the product has a predominant crystalline phase of β-spodumene solid solution within said body, and has a predominant crystalline phase of β-spodumene solid solution in said modified surface layer having higher degree of crystallization.

According to a preferred embodiment of the lithium aluminosilicate-based glass-ceramic product of the present invention, the product is a plate intended for a cook-top having two parallel main sides, which is to be fitted above cooking means, characterized in that the glass-ceramic which constitutes said plate is a transparent glass-ceramic, which is colored or not, and in that said modified surface layer having higher degree of crystallization covers at least one part of its main side to be arranged facing said cooking means.

According to a second aspect of the present invention, it is provided a method of preparing a lithium aluminosilicate-based glass-ceramic product comprising a body delimited by at least one surface from a glass precursor of said glass-ceramic, characterized in that it comprises the following steps a)–e), wherein at least one of steps b) and d) is carried out:

a) shaping the glass precursor of said glass-ceramic;
b) optionally depositing, over at least one part of the surface of said glass, an effective amount of at least one crystallization-promoting chemical agent;
c) heat-treating said glass under conditions which ensure its ceramization;
d) optionally depositing, over at least one part of the surface of the glass-ceramic obtained, an effective amount of at least one crystallization-promoting chemical agent, followed by heat treating at a temperature of between the nucleation temperature and the maximum ceramization temperature; and
e) removing the crystallization-promoting chemical agent deposited in step b) and/or step d) above and which remain free.

In a preferred embodiment of the method of the present invention, step b) is carried out.

In a preferred embodiment of the method of the present invention, the heat treatment(s) in the presence of an effective amount of at least one crystallization-promoting chemical agent is(are) implemented at a moisture level of between 1 and 20 g/m$^3$.

In a preferred embodiment of the method of the present invention, said at least one crystallization-promoting chemical agent is selected from compounds and/or metal of Zn, Cu, Zr, La, Nb, Y, Ti, Ge, V, Sn and mixtures thereof; preferably selected from compounds and/or metal of Zn, Cu, Zr, La, Nb, Y, Ti, Ge and mixtures thereof; more preferably selected from compounds and/or metal of Zn, Cu, Zr, La, Nb, Y and mixtures thereof; most preferably selected from compounds and/or metal of Zn and Cu.

In a preferred embodiment of the method of the present invention, said at least one crystallization-promoting chemical agent is deposited in the form of nitrate, carbonate, chloride and/or oxide.

The lithium aluminosilicate-based glass-ceramic product of the present invention has the technical advantages of having appealing appearance, increased modulus of rupture and ease of production. The method of the present invention has the technical advantages of ease of implementation and general applicability to lithium aluminosilicate-based glass-ceramic products.

Additional features and advantages of the invention will be set forth in the detailed description which follows, and in part will be readily apparent to those skilled in the art from the description or recognized by practicing the invention as described in the written description and claims hereof.

It is to be understood that the foregoing general description and the following detailed description are merely exemplary of the invention, and are intended to provide an overview or framework to understanding the nature and character of the invention as it is claimed.

DETAILED DESCRIPTION OF THE INVENTION

The most common glass-ceramic materials used in cook-plates and stove windows are lithium aluminosilicate-based glass-ceramics (which principally contain the following oxides: $SiO_2$—$Al_2O_3$—$Li_2O$); namely those which have crystallized with main crystalline phases of β-quartz or β-spodumene (the glass precursor being able to crystallize in the form of β-quartz and/or β-spodumene) solid solutions. Characteristically, the glass-ceramic products of the present invention, in at least one part of its surface, has a modified surface layer the degree of crystallization of which is greater than the degree of crystallization of said glass-ceramic within it, in its mass, i.e., within the body of said product under such modified layer.

The modified surface layer in question is in no way a layer which is added on, or an "over-layer". It is understood, upon considering the method of the invention set forth below (surface treatment method implemented on the glass precursor and/or the glass-ceramic) that this surface layer results from a modification of the surface of the glass-ceramic, along a small thickness. The thickness of the modified surface layer is generally less than 5 μm, preferably less than 2 μm, more preferably less than 1 μm, still more preferably of the order of 0.3 μm. The modification in question is a modification of the crystalline state of the surface, an increase in the degree of crystallization, and/or the change of the predominant crystalline phase, and/or the change of the proportion of different crystalline phases contained therein. The glass-ceramic, which constitutes said product, has a higher degree of crystallization over at least one part of the surface of the product than it is at the core.

The product of the invention, of a lithium aluminosilicate-based glass-ceramic, can be of any shape. The surface which delimits its body can itself therefore be of any shape. Characteristically, the glass-ceramic has, across at least one part of said surface, a modified surface layer with a higher degree of crystallization than that which it has in its volume under the modified surface layer.

The products of the invention can have many variants.

According to a first variant, across all of the surface of the product, a modified surface layer is found, of substantially the same degree of crystallization, greater than that of the glass-ceramic at the core of the product.

According to a second variant, in only a part of the surface of the product, a modified surface layer is found, which is continuous (i.e., in one sole part) or discontinuous (i.e., in several parts), of the same degree of crystallization, greater than that of the glass-ceramic at the core of the product, and thus also greater than that of the rest of the surface area of the product where the modified surface layer is not found.

According to a third variant, in a part of said surface, a first modified surface layer is found which is continuous or discontinuous, the degree of crystallization of which is greater than that of the glass-ceramic at the core of the product; and in at least one other part of said surface, at least a second modified surface layer is found, which is continuous or discontinuous, the degree of crystallization of which is greater than that of the glass-ceramic at the core of the product, but is different from that of said first modified surface layer. Thus, the number of modified surface layers can be n (n≧2), all with different degrees of crystallization higher than that of the glass-ceramic at the core. All those modified surface layers in combination cover the whole or a part of the surface of the glass-ceramic product. Thus, with regard to this third variant, the glass-ceramic product, in at least two zones of its surface, has modified surface layers with different degrees of crystallization, but all higher than that of the "core," which is the body under the modified surface layer.

The products of the invention according to the second and third variants set forth above do not have the same degree of crystallization in all surface area. This type of product of the invention is particularly preferred.

The products of the invention may have the following variants:

the glass-ceramic product has, within its body, a predominant crystalline phase of β-quartz solid solution whereas it has, in at least one part of the surface of said body, a modified surface layer (which is continuous or discontinuous) having a denser β-quartz solid solution as the predominant crystalline phase (it is in no way excluded that it may have, in at least two zones of said surface, multiple modified surface layers having β-quartz solid solution with different density as the predominant crystalline phases); or the glass-ceramic product has, within its body, a predominant crystalline phase of β-quartz solid solution, and, in at least one part of the surface of said product, a modified surface layer (which is continuous or discontinuous) having β-spodumene solid solution as the the predominant crystalline phase (it is in no way excluded that it may have, in at least two zones of said surface, multiple modified surface layers having β-spodumene solid solution with different densities as the predominant crystalline phases); or the glass-ceramic product has, within its body, a predominant crystalline phase of β-spodumene solid solution, and, in at least one part of the surface of said body, a modified surface layer (which is continuous or discontinuous) having a denser β-spodumene solid solution as the predominant crystalline phase, with optional rutile or spinel type crystals (it is in no way excluded that it has, in at least two zones of said surface, multiple modified surface layers having denser β-spodumene solid solution with different degrees of crystallization as the the predominant crystalline phases, together with rutile or spinel type crystals.

The variants set forth above are in no way limiting. For a body comprising β-quartz solid solution as the predominant crystalline phase, it is also possible that different modified surface layers may be formed which comprise denser β-quartz solid solution as the main crystalline phase in certain modified surface layers and β-spodumene solid solution as the main crystalline phase in other modified surface layers.

The products of the invention which are non-homogeneous as to degree of crystallization are marked by their method of preparation. They bear the signature of processes of making them. That is, the modified surface layer having higher degree of crystallization have higher amounts of certain crystallization-promoting elements than in the body under the modified surface layer of the products. Such crystallization-promoting elements are selected from the group consisting of Zn, Cu, Zr, La, Nb, Y, Ti, Ge, V, Sn and mixtures thereof; preferably selected from the group consisting of Zn, Cu, Zr, La, Nb, Y, Ti, Ge and mixtures thereof; more preferably selected from the group consisting of Zn, Cu, Zr, La, Nb, Y and mixtures thereof; most preferably selected from the group consisting of Zn and Cu. The difference of the level of crystallization-promoting elements in the body and the modified surface layer can be big or small, and varies depending on the composition of the glass-ceramic and crystallization phases and densities thereof, the nature of the crystallization-promoting agents, as well as the desired level of difference in the crystallization degrees between the body and the modified surface layers. If the body of the glass-ceramic product is essentially free of the crystallization-promoting element, the modified surface layer may contain traces of it. In addition, the modified surface layer may be further covered by a layer of oxide(s) of at least one chemical element which promotes crystallization. Such a layer of oxide generally has a thickness of about less than 2 µm preferably less than 1 µm, more preferably on the order of 0.2 µm. It will be discussed hereinafter that the presence of such a layer of oxide(s) of the crystallization-promoting element can be linked to moisture present during the surface treatment of the precursor glass or glass-ceramic using the crystallization-promoting agents.

As indicated above, the products of the invention can be of any shape. Advantageously, they are plate-shaped (i.e., of lithium aluminosilicate-based glass-ceramic plates having two parallel main sides and generally of low thickness), notably for use indicated above as cooktops and/or stove windows, and the like. Said plates can be planar, but are not limited to such configuration. Said plates can be rounded, can comprise folding as disclosed in U.S. Pat. No. 5,968, 219, or deformations as disclosed in U.S. Pat. No. 5,931, 152.

Within this context of the plates, preferred embodiments of the glass-ceramic products of the present invention include:

in at least the surface of one of the two main sides, the plate has a modified surface layer having higher degree of crystallization than in the body of the plate. Where the plate is a cooktop, the surface of the upper side can be advantageously modified and decorated according to the present invention. The heating zones, the control zones, and the like, can notably be thus defined and marked. These different zones can be modified to have different brilliance or opacity with different degrees of crystallization, or to have different colors.

the glass-ceramic constituting the plate, which is intended to constitute a cook-top, which is fitted above cooking means, is a transparent glass-ceramic, which is colored or not (sufficiently transparent in order that the decorative effect sought after and obtained (the metallic appearance) may be appreciated) and the modified surface layer having higher degree of crystallization covers at least one part of tne main side of said plate to be arranged facing said cooking means/heating elements. Under this assumption, the lower side of a cook-top is decorated. The "over-crystallization" can ensure, in addition to the decorative effect, an improvement of the mechanical properties of the decorated side (lower side), which is very appreciable.

In general, the glass-ceramic products of the present invention are based on lithium aluminosilicate glass. It has been seen that the glass-ceramics in question are those which are the most-known of this type (which are obtained from precursor glasses $SiO_2$—$Al_2O_3$—$Li_2O$), i.e., those which contain β-quartz or β-spodumene solid solution as main crystalline phase. These glass-ceramics are well known to the person skilled in the art.

In an entirely non-limiting way, indication can be given that the glass-ceramics of the invention can notably be obtained from glass-ceramics which are described in U.S. Pat. Nos. 5,070,045, 5,446,008, French applications No. FR-A-2,766,816 and Japanese patent application publication No. JP-A-11100229.

The glass-ceramic products of the present invention have, at the core, a classical composition by weight based therefore on $SiO_2$, $Al_2O_3$ and $Li_2O$, also generally containing MgO, ZnO, $TiO_2$, $ZrO_2$ and, furthermore, can contain BaO, SrO, $Na_2O$, $K_2O$. Said glass-ceramics advantageously contain an effective and non-excess amount of at least one fining agent, and, optionally, an effective amount of at least one colorant, generally selected from CoO, $Cr_2O_3$, $Fe_2O_3$, $MnO_2$, NiO, $V_2O_5$ and $CeO_2$, and mixtures thereof. The person skilled in the art knows how to manage the incorporation of the fining agents. The fining agent is generally incorporated at less than 3% by weight, desirably less than 2% by weight of this type of compounds.

As indicated in U.S. Pat. No. 5,070,045, $As_2O_3$ and/or $Sb_2O_3$ can be incorporated as fining agent, in the amounts below:

| | |
|---|---|
| $As_2O_3$ | 0–1.5 |
| $Sb_2O_3$ | 0–1.5 |
| With $As_2O_3$ + $Sb_2O_3$ | 0.5–1.5 (% by weight). |

Other fining agents, such as $SnO_2$, $CeO_2$, fluorides, sulfides or sulfates, alone or in a mixture, can similarly be incorporated.

As regards the optional incorporation of colorant(s), it is well known by the person skilled in the art.

In a purely illustrative manner, mention is made here that the Applicant notably prepares glass-ceramic plates having a composition as indicated in U.S. Pat. No. 5,070,045, colored with vanadium and having β-quartz solid solution as the predominant crystalline phase (IR-transparent black plates marketed under the trademark Kerablack®) and glass-ceramic plates having a composition as indicated in FR-A-2,766,816, which is colored or not with cerium (translucent plates, which are marketed under the trademark Kerawhite® (non-colored) or Kerabisque® (which are colored with cerium)). Such plates can be advantageously treated according to the present invention (see below) to form the glass-ceramic products of the present invention.

According to its second aspect of the present invention, it is provided a method of preparing treated glass-ceramic products, as described above. It has already been understood that this is a method of preparing glass-ceramic products which incorporates a surface treatment of a specific nature. Said surface treatment can be implemented before and during the ceramization and/or after said ceramization.

More generally, according to the second aspect of the present invention, it is provided a method of preparing a lithium aluminosilicate-based glass-ceramic product comprising a body delimited by at least one surface from a glass precursor of said glass-ceramic, characterized in that it comprises the following steps a)–e), wherein at least one of steps b) and d) is carried out:

a) shaping the glass precursor of said glass-ceramic;
b) optionally depositing, over at least one part of the surface of said glass, an effective amount of at least one crystallization-promoting chemical agent;
c) heat-treating said glass under conditions which ensure its ceramization;
d) optionally depositing, over at least one part of the surface of the glass-ceramic obtained, an effective amount of at least one crystallization-promoting chemical agent, followed by heat treating at a temperature of between the nucleation temperature and the maximum ceramization temperature; and
e) removing the crystallization-promoting chemical agent deposited in step b) and/or step d) above and which remain free.

According to a first variant of the method of present invention, step b) is carried out. More preferably, said method comprises steps a), b), c) and e) above, but not step d). This variant avoids the implementation of an additional heat treatment of the cerammed glass-ceramic plate for the purpose of modifying the surface area. It can be considered that a single heat treatment ensures the classical crystallization ("ceramming" or "ceramization") of the precursor glass as well as the surface modification.

According to a second variant of the process of the present invention, step d) is carried out. Preferably said method comprises steps a), c), d) and e) above, but not step b). Said at least one crystallization-promoting chemical element is incorporated on the surface of a ceramized substrate in a post-ceramming step. Thus a post-ceramming surface modification step is needed.

According to a third variant, said method comprises steps a), b), c), d) and e) above. At least one crystallization-promoting chemical element is used before, during and after ceramization. Of course, the same or different types of crystallization-promoting agents may be used at different stages. Their respective effect accumulates on the same or on different surface zones, according to their respective zone of use to achieve the final intended surface modification result.

The key of the method of the invention is thus the use, on the surface, of at least one crystallization-promoting chemical agents, in order to generate the modified surface layer having a higher degree of crystallization as discussed above. Said at least one agent is deposited on the desired surface area and takes effect during the heat treatment, including the basic ceramizing heat-treatment and/or the additional post-ceramization heat treatment.

Said at least one crystallization-promoting chemical agent is deposited over all the surface or over only a part of the surface (continuously or discontinuously). The same crystallization-promoting chemical agent can be used at different amount or concentration; or at least two different crystallization-promoting chemical agents may be used in different zones of said surface. It is conceived that the product of the invention can thus be prepared in any of its variants set forth above.

A part of the at least one crystallization-promoting chemical agent is not intended to integrate into the structure of the modified surface layer. This part is removed in step e) of the method of the invention generally by, for example, blowing or washing, if it is in powder form. Only the fraction of said chemical element which can be removed, i.e., which remains free, is in fact removed in step e) of the method of the invention. This fraction is the one which was neither trapped on the surface in the form of an oxide layer, nor trapped in modified surface layer having higher degree of crystallization.

The inventors have discovered that the crystallization-promoting effect of, as well as the formation of an oxide-layer by, the crystallization-promoting agent, depends to a large extent on the moisture level of the atmosphere in which the heat treatment in the presence of the crystallization-promoting agent is carried out. More specifically, the moisture level seems to intervene on the presence or not of the oxide layer formed from the agent, on the higher degree of crystallization in the modified surface layer sought after, and on the intensity of the metallic appearance expressed after such crystallization promoting treatment. The water vapor present in the atmosphere of treatment (ceramization when said at least one agent is deposited on the surface of the glass precursor and annealing when said at least one agent is deposited on the surface of the cerammed glass-ceramic) appears to be a reaction catalyst. The higher the moisture in the atmosphere, the more intense the metallic appearance on the treated surfaces. Significant deviations in intensity of metallic appearance were observed with the eye at different moisture levels between 1 $g/m^3$ (not very bright metallic appearance) and 20 $g/m^3$ (bright metallic appearance) of the treatment atmosphere.

It is recommended, within the context of the present invention, to implement the heat treatments of ceramization and/or of post-ceramization annealing at a treatment atmospheric moisture level of between 1 and 20 $g/m^3$. Preferably, the moisture level is controlled.

It is in no way excluded to operate at higher levels (checks will however be made to control the quality of the products obtained) and at lower levels. In this latter context, the "over-ceramization" surface layer is a priori no longer surmounted by a layer of oxide of said at least one chemical element which promotes crystallization. The modified surface layer contains traces of the element of the crystallization-promoting agent.

As regards the nature of said chemical agent which promotes crystallization, as described above, it is generally selected from the compounds and/or metal of Zn, Cu, Zr, La, Nb, Y, Ti, Ge, V, Sn and mixtures thereof, preferably selected from the compounds and/or metal of Zn, Cu, Zr, La, Nb, Y, Ti, Ge and mixtures thereof, more preferably selected from the compounds and/or metal of Z, Cu, Zr, La, Nb, Y and mixtures thereof; and most preferably selected from the compounds and/or metal of Zn and Cu.

It has been incidentally observed that the element Cu presents a particularly strong crystallization-promoting action.

The person skilled in the art has in fact even to master the strength of the action developed by notably selecting the nature of the element in question and its amount of use, as well as the conditions, such as temperature, under which said element is allowed to act. A person skilled in the art has in fact understood that if the strength of the action developed is excessive, the product may be greatly weakened.

With reference to said at least one crystallization-promoting chemical agent, indication can be made furthermore that it is generally deposited on the surface of the precursor glass or of the glass-ceramic in the form of nitrate, carbonate, chloride and/or oxide.

The deposit of ZnO or CuO is more particularly recommended.

Generally, said at least one crystallization-promoting chemical agent is deposited in solid form or in liquid form.

It can notably be deposited in the form of a powder, pure or diluted in an inert filler (neutral with respect to the effect sought after). Said powder can also have been diluted in a binder which allows the implementation of such deposition technique.

It can therefore be deposited in a liquid form. Solutions, suspensions, which are more or less viscous, even sol-gels, may therefore be used.

The deposition method is obviously adapted to the form in which said at least one crystallization-promoting chemical agent is. Deposition by hand, with a brush, with a roller, as a spray, by screen printing, or by decalcomania, can be envisaged. This list of techniques is not exhaustive.

It is more particularly recommended to make a selective deposition of said at least one crystallization-promoting chemical agent by screen printing, said at least one agent having been mixed with a suitable binder. Said binder does not disturb the action of said at least one agent insofar as it decomposes at the high temperature of heat treatment.

The method of the invention is advantageously implemented for the preparation of products in the form of plates (see above). To this end, in step a), the glass-ceramic precursor glass is formed into a plate, and the at least one crystallization-promoting agent is deposited over at least one part of the surface of one and/or the other of the two main sides of said plate. The plate may have been ceramized (such as in step d)) or not ceramized (such as in step b)) when the crystallization-promoting agent is deposited.

The invention, under its aspects of product and method, is now illustrated in an entirely non-limiting way by the Examples below.

EXAMPLE 1

The reference plate, which is marketed under the trademark Kerablack®, is a plate which is obtained according to Example 1 of U.S. Pat. No. 5,070,045. The glass precursor has the composition by weight given in Table 1 of said US patent; it contains $V_2O_5$ as colorant. The ceramization cycle implemented under ambient atmosphere is that specified in columns 5 and 6 of said patent. The glass-ceramic constituting the plate has β-quartz solid solution as the predominant crystalline phase. (The person skilled in the art does not ignore that traces of β-spodumene are found in this glass-ceramic plate, however only at a relatively large depth, but not in the very near surface area: see Table 1 below).

The invention is implemented in order to treat the whole surface of a main side of such a Kerablack® glass-ceramic plate.

ZnO powder was uniformly deposited over the whole surface of a main side of the precursor glass in the form of a plate, at the rate of about 1 g/cm$^2$ (the composition of the glass precursor appears in Table 1 of the U.S. Pat. No. 5,070,045). The resulting assembly is ceramized by the same ceramization cycle implemented under the same ambient atmosphere as that specified above for the reference plate (columns 5 and 6 of the U.S. Pat. No. 5,070,045).

After the ceramization heat treatment, a puff of air is sent over the surface supporting the ZnO so as to remove the residual powder from said surface. The thus-treated surface of the glass-ceramic plate obtained ("ZnO-treated Kerablack®") possesses a pronounced metallic appearance.

X-Ray diffraction analysis (XRD) shows that this plate contains a modified surface layer comprising β-spodumene solid solution as the predominant crystalline phase. The XRD measurements were made by a method which is familiar to the person skilled in the art, and is known as the measurement of the "Grazing Incidence Angle Diffraction: GIAD". Table 1 below compares the intensities of the β-spodumene peak for two samples: the Kerablack® plate of the prior art and the "ZnO treated Kerablack®" plate of the invention.

TABLE 1

| Depth (μm)* | Relative intensity of the β-spodumene peak for the reference plate (Kerablack ®) | Relative intensity of the β-spodumene peak for the plate of the invention ("ZnO-treated Kerablack ®") |
|---|---|---|
| 2.1 | — | 5,943 |
| 2.8 | — | 6,703 |
| 4.8 | — | 9,149 |
| 6.9 | — | 10,163 |
| 10.3 | — | 12,029 |
| 13.7 | 508 | 13,876 |
| 17 | 687 | 13,732 |

*the depth analyzed is a function of the angle of incidence of the rays.

A ZnO layer was furthermore observed on the β-spodumene surface layer of the plate of the invention.

An improvement of the mechanical strength of the side treated (with ZnO) was also observed. The measurements of mechanical strength were made according to the ASTM Standard F394-78 on a sampling of at least 7 test-plates. The reference Kerablack® plate has a mean MOR (modulus of rupture) of 215±28 MPa, whereas the "ZnO-treated Kerablack®" plate of the invention has a mean MOR of 256±5 MPa; and this represents a gain of close to 20%.

EXAMPLE 2

The procedures in Example 1 was repeated except for the following differences:
- the ZnO powder was well-mixed with a pine oil-based organic medium;
- the mixture was deposited on one part of the surface of only one of the main sides of the precursor glass by screen printing according to a determined pattern.

The viscosity of the mixture of ZnO powder and organic medium was adjusted so that the screen printing technique is suitable for depositing said mixture.

Pronounced metallic appearance developed, but only on the areas where said mixture had been deposited.

EXAMPLE 3

In this Example, the ZnO powder was deposited over the whole surface of a main side of a ceramized glass-ceramic Kerablack® plate.

The deposit was done under the same conditions as in Example 1 (on glass-ceramic instead of glass precursor of said glass-ceramic).

The resulting assembly (glass-ceramic plate+ZnO powder, on the whole surface of one of the main sides) was then heat treated. It was subjected to an annealing cycle at 950° C. for 15 minutes. Once the residual ZnO powder was removed (by air blowing), a metallic appearance was observed on the treated side, which is essentially identical what is observed in Example 1.

EXAMPLE 4

The procedures in Example 1 were implemented except:

The reference plate was a plate which is obtained according to Example 1 of French patent application FR-A-2,766,816, which is marketed under the trademark Kerawhite®. The glass precursor has the composition by weight given on page 4 of said Application. The ceramization cycle, which was implemented in an ambient atmosphere, is specified in Example 1 of said Application. The glass-ceramic constituting the plate has a predominant crystalline phase of β-spodumene solid solution.

The invention was implemented by depositing ZnO powder over the whole surface of a main side of the precursor glass plate. Said glass has the composition described in FR-A-2,766,816 above and the assembly (glass plate+ZnO powder, over the whole of one of its main sides) is ceramized as described this reference.

The treated side of the "ZnO-treated Kerawhite®" plate had an iridescent appearance as well as an improved mechanical strength: MOR=176±6 MPa. A non-treated side (one of the main sides) of the reference Kerawhite® plate had a lower mechanical strength: MOR=114±2 MPa.

EXAMPLE 5

Example 1 was repeated except that a different crystallization-promoting element was used: copper instead of zinc. Copper oxide, CuO, was in fact used on the precursor glass plate of a Kerablack® plate.

After the ceramization cycle and the removal of the residual CuO powder, the "CuO-treated Kerablack®" glass-ceramic has a very pronounced metallic surface appearance. This metallic appearance indicates the presence of β-spodumene. An X diffraction study by the GIAD method described above gave the conclusions below.

TABLE 2

| Depth (μm) | Relative intensity of the β-Spodumene peak for the reference plate (Kerablack ®) | Relative intensity of the β-spodumene peak for the plate of the invention ("CuO-treated Kerablack ®") |
|---|---|---|
| 1 | — | 25,240 |
| 2 | — | 87,458 |
| 5.5 | — | 162,327 |
| 10.3 | — | 410,245 |

EXAMPLE 6

Example 5 was repeated, except that the copper oxide (CuO) powder diluted in aluminum ($Al_2O_3$) powder was deposited on the surface of the glass-ceramic precursor glass. A 50/50 mixture (by weight) was deposited at the rate of 1 g/cm². The metallic effect obtained was less than that obtained in Example 4.

The invention claimed is:

1. A lithium aluminosilicate-based glass-ceramic product comprising a body delimited by at least one surface, at least one part of said surface having a modified surface layer with a higher degree of crystallization than that of the body under said modified surface layer, characterized in that, compared to the body under the modified surface layer, said modified surface layer contains higher amount of at least one crystallization-promoting chemical element selected from the group consisting of Zn, Cu, Zr, La, Nb, Y, Ti, Ge, V, Sn and mixtures thereof.

2. The product according to claim 1, characterized in that said product, in at least two zones of said surface, has modified surface layers with different degrees of crystallization.

3. The product according to claim 1, characterized in that the product has a predominant crystalline phase of β-quartz solid solution within said body, and has a predominant crystalline phase of β-quartz solid solution in said modified surface layer having higher degree of crystallization.

4. The product according to claims 3, which is a plate intended for a cook-top having two parallel main sides, which is to be fitted above cooking means, characterized in that the glass-ceramic which constitutes said plate is a transparent glass-ceramic, which is colored or not, and in that said modified surface layer having higher degree of crystallization covers at least one part of its main side to be arranged facing said cooking means.

5. The product according to claim 1, characterized in that the product has a predominant crystalline phase of β-quartz solid solution within said body, and has a predominant crystalline phase of β-spodumene solid solution in said modified surface layer having higher degree of crystallization.

6. The product according to claims 5, which is a plate intended for a cook-top having two parallel main sides, which is to be fitted above cooking means, characterized in that the glass-ceramic which constitutes said plate is a transparent glass-ceramic, which is colored or not, and in that said modified surface layer having higher degree of crystallization covers at least one part of its main side to be arranged facing said cooking means.

7. The product according to claim 1, characterized in that the product has a predominant crystalline phase of β-spodumene solid solution within said body, and has a predominant crystalline phase of β-spodumene solid solution in said modified surface layer having higher degree of crystallization.

8. The product according to claims 7, which is a plate intended for a cook-top having two parallel main sides, which is to be fitted above cooking means, characterized in that the glass-ceramic which constitutes said plate is a transparent glass-ceramic, which is colored or not, and in that said modified surface layer having higher degree of crystallization covers at least one part of its main side to be arranged facing said cooking means.

9. The product according to claims 1, which is a plate intended for a cook-top having two parallel main sides, which is to be fitted above cooking means, characterized in that the glass-ceramic which constitutes said plate is a transparent glass-ceramic, which is colored or not, and in that said modified surface layer having higher degree of crystallization covers at least one part of its main side to be arranged facing said cooking means.

10. The product according to claim 1, characterized in that, compared to the body under the modified surface layer, said modified surface layer contains higher amount of at least one crystallization-promoting chemical element selected from the group consisting of Zn, Cu, Zr, La, Nb, Y, Ti, Ge and mixtures thereof.

11. The product according to claim 1, characterized in that, compared to the body under the modified surface layer, said modified surface layer contains higher amount of at least one crystallization-promoting chemical element selected from the group Consisting of Zn, Cu and mixture thereof.

* * * * *